United States Patent
Kinard et al.

(12) 
(10) Patent No.: US 6,235,181 B1
(45) Date of Patent: *May 22, 2001

(54) METHOD OF OPERATING PROCESS FOR ANODIZING VALVE METALS

(75) Inventors: John T. Kinard, Simpsonville; Brian J. Melody, Greer; David A. Wheeler, Williamston, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/265,593

(22) Filed: Mar. 10, 1999

(51) Int. Cl.⁷ .............................. C25D 11/04; C25D 11/26
(52) U.S. Cl. ..................... 205/148; 205/234; 205/322; 205/324; 205/332
(58) Field of Search ................... 205/106, 148, 205/234, 322, 324, 332, 171

(56) References Cited

U.S. PATENT DOCUMENTS

| | | | |
|---|---|---|---|
| 3,180,809 | 4/1965 | Gregori | 205/171 |
| 3,359,191 | 12/1967 | Minami et al. | 205/171 |
| 3,496,424 | 2/1970 | Behrend | 361/524 |
| 3,563,863 | 2/1971 | Vierow | 205/138 |
| 3,796,644 | 3/1974 | Bernard | 205/332 |
| 3,943,041 | 3/1976 | Jackson | 205/152 |
| 4,196,060 | 4/1980 | Patrie et al. | 205/50 |
| 4,383,897 | 5/1983 | Gillich et al. | 101/459 |
| 4,388,156 | 6/1983 | Gillich et al. | 205/235 |
| 4,476,517 | 10/1984 | Fresia | 361/327 |
| 4,479,166 | 10/1984 | Finkelstein et al. | 361/506 |
| 4,781,802 | 11/1988 | Fresia | 205/171 |
| 4,823,236 | 4/1989 | Fresia | 361/506 |
| 5,111,365 | 5/1992 | Dapo | 361/506 |
| 5,211,741 | 5/1993 | Fife | 75/255 |
| 5,211,832 * | 5/1993 | Cooper | 205/322 |
| 5,385,662 | 1/1995 | Kurze et al. | 205/316 |
| 5,560,761 | 10/1996 | Naito | 75/255 |
| 5,580,367 | 12/1996 | Fife | 75/255 |
| 5,580,825 * | 12/1996 | Labunov et al. | 437/194 |
| 5,587,871 | 12/1996 | Ue et al. | 361/504 |
| 5,605,561 | 2/1997 | Iwabuchi et al. | 75/364 |
| 5,687,057 | 11/1997 | Dapo | 361/506 |
| 5,716,511 | 2/1998 | Melody et al. | 205/324 |
| 5,837,121 * | 11/1998 | Kinard et al. | 205/322 |

FOREIGN PATENT DOCUMENTS 537474   6/1941   (GB) .

OTHER PUBLICATIONS

F. A. Lowenheim, Electropicting, McGraw–Hill Book Co., New York, pp. 139, 1978.*

Melody et al., "An Improved Series of Electrolytes for Use in the Anodization of Tantalum Capacitor Anodes," Presented at the Capacitor and Resistor Technology Symposium (C.A.R.T.S. '92), Mar. 17, 1992, pp. 1–11.

Patent Abstracts of Japan, vol. 10, No. 373, Abs Grp. No.: C391, Abstracting Appln. No. 60–8438, Dec. 1986.

* cited by examiner

Primary Examiner—Kathryn Gorgos
Assistant Examiner—William T. Leader
(74) Attorney, Agent, or Firm—Banner & Witcoff, Ltd.

(57) ABSTRACT

A method of anodizing a metal comprising immersing a metal substrate into an a glycerine-based electrolytic solution and applying a constant current to produce a uniform film. The electrolytic solution additionally comprises at least one acidic organic salt, inorganic salt, or mixtures thereof. Suitable salts include dibasic potassium phosphate, P-toluene sulfonate, potassium hydrogen sulfate and monobasic potassium tartrate. The electrolytic solution may be prepared by mixing glycerine and the salt or salts, and then heating the solution to about 150 to 180° C. for about 1 to 12 hours. The prepared solution preferably has a water content of less than 0.1 wt %. Anodizing may be performed in the electrolytic solution at temperatures above about 150° C. to achieve non-thickness-limited film growth. Temperature fluctuations within the solution are reduced by the use of impellers or ultrasonic agitation.

27 Claims, No Drawings

METHOD OF OPERATING PROCESS FOR ANODIZING VALVE METALS

FIELD OF THE INVENTION

The present invention is directed to a method of preparing anode oxide films.

BACKGROUND OF THE INVENTION

U.S. Pat. No. 5,837,121, and patent application Ser. No. 09/090,164, filed Jun. 4, 1998, now U.S. Pat. No. 6,149,793, each describe a method and electrolyte for anodizing the "valve" metals (metals, alloys, inter-metallic compounds and metallic glasses which form non-porous and adherent anodic oxide films having high electrical resistance, e.g., aluminum, tantalum, titanium, niobium, etc.).

Both the patent and the application are directed to electrolytic solutions for anodizing a metal comprising forming a film on the metal with an electrolytic solution. The film is formed at a temperature of 150° C. or higher. The patent is directed to an electrolytic solution comprising glycerine and dibasic potassium phosphate and having a water content of less than 1000 ppm (0.1 wt %) and prepared by mixing the glycerine and the dibasic potassium phosphate and then heating to about 150 to 180° C. for about 1 to 12 hours. The application is directed to an electrolytic solution having a pH less than about 7 and comprising glycerine and an organic salt, an inorganic salt, a mixture thereof and having a water content of less than 0.1 wt % and prepared by mixing the glycerine and the salts or their acidic and basic ionogens and then heating the solution to above 150° C.

Under constant voltage conditions, the anodic oxide grows thicker indefinitely and yet is found to be non-porous and very electrically resistive when removed from the unusual anodizing conditions and electrolyte described in these documents.

This method of anodizing, which has been labeled: "non-thickness-limited" anodizing, is further described in the paper, entitled: "The Non-Thickness-Limited Growth of Anodic Oxide Films on Valve Metals", by Brian Melody, Tony Kinard, and Philip Lessner, which appears in *Electrochemical and Solid State Letters*, Vol. 1, No. 3, September, 1998, published by the Electrochemical Society.

It is known that there is an induction period between the application of voltage across an anodic oxide film and the build-up of the anodizing current to a peak value after the application of voltage under conditions otherwise known to give rise to non-thickness-limited anodic oxide growth (i.e., appropriate electrolyte composition and temperature as described in the patent documents cited above). The length of the induction period has been found to be, generally, inversely proportional to the field through the oxide; the thinner the oxide, the higher the field and the shorter the induction period for a given applied voltage. Thus, a pulsed voltage may be utilized to achieve a more uniform oxide thickness on irregularly shaped objects or within porous anode bodies than is readily obtained with d.c. voltage.

By using the process and electrolytes described in the above-cited documents, it is possible to prepare non-porous, highly electrically resistive anodic oxide films, also known as "barrier" films, on valve metals which greatly exceed in thickness barrier anodic oxide films prepared by other known electrolyte process. Utilizing this non-thickness-limited anodizng technology, anodic oxide films have been grown upon aluminum to a thickness in excess of 10 microns, and upon tantalum to a thickness in excess of 20 microns.

While the non-thickness-limited anodizing technology described in the above-cited documents facilitate the growth of barrier anodic oxide films on valve metals which may be 10 times or more the thickness possible with any other known anodizing method, the thickness of the films is difficult to predict. The reason it is difficult to predict the thickness of these films is that, while the anodic oxide film growth is a Faradaic process, i.e., the film thickness is a function of the total current passed per unit area of valve metal surface (though the process is not 100% efficient; a portion of the current does not produce anodic oxide), the current density varies sharply with electrolyte temperature at constant voltage. Then, under constant voltage conditions, small variations in the electrolyte temperature tend to result in large variations in current density, which, in turn, result in large variations in anodic oxide growth rate.

Furthermore, at the temperatures required for non-thickness-limited film growth, (i.e., above about 150° C.), it is very difficult to control temperature fluctuations of only a few degrees throughout the total mass of electrolyte present in production-scale anodizing equipment. Temperature fluctuations can be controlled by careful placement of stirring impellers, etc., and, especially through the use of ultrasonic agitation at relatively high power densities of ultrasonic sound (e.g., 100+ watts/liter at 40 kHz). Note that the high room temperature viscosity of glycerine and of the glycerine-based electrolyte solutions would normally preclude the use of ultrasonic energy to produce effective agitation. At about 150° C. and above, however, the electrolytes described in the above-cited patent documents are sufficiently fluid to be effectively agitated ultrasonically.

By the use of impellers or ultrasonic agitation, the temperature fluctuations within the bulk is drastically reduced or eliminated. However, the average temperature of the bulk of the electrolyte will drift over time. Further, there is a small change in the oxide resistivity due to increasing thickness over the course of an anodizing run. The changes in average temperature and the oxide resistivity will cause a variation in the current density and, hence, in the anodizing current efficiency.

Additionally, any glycerine lost through evaporation during the anodizing must be replaced periodically by glycerine additions. Commercially available glycerine generally contains at least 0.3 wt % water. Unless the glycerine is dried before use (by heating to 180° C. for 1 hour, for example), the water in the glycerine will cause a reduction in current density when the glycerine is added to the anodizing electrolyte. Furthermore, the current density will tend to rise (under constant voltage conditions) as the water content of the electrolyte is reduced through evaporation. Thus, the constant voltage current density tends to fall initially then rise after each evaporation make-up glycerine addition.

The magnitude of the variability of the current density at constant voltage which may occur during non-thickness-limited anodizing with the electrolytes described in the above-cited documents is shown in Table 1. A tantalum coupon was anodized in an electrolyte consisting of 10 wt % sodium tetraborate decahydrate in glycerine which was previously heat-treated to reduce the water content to below 0.1 wt %. The voltage was fixed at 30 volts and the nominal temperature was 180° C. The current was observed to surge to 3.89 milliamperes/cm$^2$ initially and to vary between 0.28 and 1.47 milliamperes/cm$^2$ over a period of only 15 minutes. This demonstrates the difficulty in predicting the amount of material produced by a Faradaic process having such high current variability.

TABLE 1

Nominal Temperature = 180° C.

| Time (min.) | Voltage (volts) | Current (mA/cm$^2$) |
|---|---|---|
| (on) | (rising) | 3.89 |
| 1 | 30 | 1.11 |
| 2 | 30 | 0.37 |
| 3 | 30 | 0.29 |
| 4 | 30 | 0.28 |
| 5 | 30 | 0.29 |
| 6 | 30 | 0.31 |
| 7 | 30 | 0.35 |
| 8 | 30 | 0.39 |
| 9 | 30 | 0.44 |
| 10 | 30 | 0.51 |
| 11 | 30 | 0.61 |
| 12 | 30 | 0.74 |
| 13 | 30 | 0.93 |
| 14 | 30 | 1.17 |
| 15 | 30 | 1.47 |

SUMMARY OF THE INVENTION

The present invention is directed to a method of anodizing a metal comprising immersing a metal substrate into an a glycerine-based electrolytic solution and applying a constant current to produce a uniform film.

The present invention is further directed to an anodizing process which produces uniform and predictable oxide thickness using an electrolyte composition and valve metal substrate.

The present invention is further directed to an anodizing process conducted at a temperature above about 150° C. which provides predictable results in uniform oxide thickness produced per unit time.

The present invention is further directed a process wherein the electrolytic solution is agitated while applying the constant current. Preferably the electrolytic solution is ultrasonically agitated.

It is to be understood that both the foregoing general description and the following detailed description are exemplary and explanatory only and are not restrictive of the present invention as claimed.

DETAILED DESCRIPTION OF THE PREFERRED EMBODIMENTS

Due to minor variations in average electrolyte temperature, small increases in oxide resistance due to increasing thickness, and, especially, variations in the water content of the electrolyte solution due to the evaporative make-up additions of commercially available glycerine, there is variability in the fixed d.c. voltage anodizing current density and variability in oxide growth rate. It was discovered that such variabilities may be avoided by employing a constant current during the anodizing process, which allows the voltage to vary upward and downward with variations in average electrolyte temperature and water content, as well as with the minor oxide resistivity increase with the increasing thickness.

The present invention is thus directed to an anodizing process of producing uniform and predictable oxide thickness using an electrolyte composition and valve metal substrate. The present invention is further directed to an anodizing process conducted at a temperature above about 150° C. which provides predictable results in uniform oxide thickness produced per unit time. The present invention is further directed to a process of anodizing that is conducted in a well-agitated vessel and under constant current conditions.

Constant current has been used in traditional anodizing of, for example, tantalum powder metallurgy capacitor anodes, as an alternative to the application of full or stepped voltage in order to avoid overheating the anodes (through the passage of excessive current) upon the application of voltage. In such traditional anodizing, the use of constant current results in a nearly linear rise in applied voltage until a preset voltage is reached, followed by a rapid decay in current at this voltage such that the resistance across the anodizing cell (mainly, across the anodic oxide) rises nearly linearly with time, even after the set point voltage is reached.

In contrast, constant current is employed in the present invention in order to obtain a nearly constant rate of oxide growth throughout the process and with only a relatively minor change in the anodic oxide resistivity. That is, in non-thickness-limited anodizing mode in which the oxide grows indefinitely thicker at a nearly constant rate as long as voltage is applied.

It was further discovered that there is an optimal current density (i.e., current per unit area) for each valve metal and alloy, etc., for efficient oxide formation in the non-thickness-limited anodizing process. For tantalum, the range of functional current density is up to about 0.5 milliampere/cm$^2$ of tantalum surface. The preferable range of current density is approximately 0.01 to 0.5 milliampere/cm$^2$ of tantalum surface, more preferably 0.3 to 0.5 milliampere/cm$^2$. A current density lower than about 0.3 milliampere/cm$^2$ produces less anodic oxide per unit time while application of a significantly higher current density (for example, 1.0 milliampere/cm$^2$) results in production of a flawed oxide containing a large fraction of crystalline (electrically leaky) tantalum oxide. Constant current means a current that varies less than 10%, preferably less than 5%, more preferably less than 1%.

The use of constant current gives rise to a predictable anodic oxide thickness because non-thickness-limited anodizing is essentially a faradaic process, i.e., the thickness of the anodic oxide is proportional to the total current passed per unit area of valve metal surface. With constant current, the total current passed per unit area may be readily calculated by multiplying the current density (current per unit area) by the time the current is flowing. It should be understood that currents which are not constant, but which fluctuate in a predictable manner, such as half-wave or full-wave rectified A.C., may act as pseudo constant current and give very predictable anodic oxide thickness vs. time if a feedback loop on the rectified A.C. power supply is present which maintains the rectified A.C. voltage pulses so as to produce a uniform wave form and peak current for each current pulse. In this manner a predictable amount of current is made to flow per unit area through the valve metal surface resulting in the production of a predictable amount of anodic oxide with little or no variation due to changes in cell resistance with temperature, etc. As with truly constant current, pseudo constant currents must not exceed about 0.5 milliamperes per square centimeter peak current flow in order to prevent damage to the anodic oxide layer.

At near-optimal current densities for anodic oxide growth (e.g., 0.25 milliampere/cm$^2$), the current may be initially conducted completely electronically through the passive oxide layer coating the item to be anodized with no oxide growth taking place. Under these conditions anodic oxide growth may be initiated in one of two ways:

1) By momentarily raising the current density to approximately 1 milliampere/cm$^2$ or more by momentarily raising the voltage.

2) By first anodizing to at least 2 or 3 volts in a traditional anodizing solution, then transferring the item(s) to be anodized to an anodizing vessel containing one of the non-thickness-limited electrolytes described in the above-cited documents and anodizing at constant current of more optimum value.

The electrolyte solutions useful in the present invention are disclosed in U.S. Pat. No. 5,837,121 and Ser. No. 09/090,164 which are hereby incorporated by reference in their entirety. The solutions are solutions of dibasic potassium phosphate in glycerine or other glycerine-based solutions. It is preferable that the solution is heated to 180° C. for 1–2 hours, or to 150° C. overnight. The amount of water present in the electrolytic solution is preferably less than 1000 ppm (less than 0.1 wt %), preferably less than 900 ppm.

The electrolytic solution has a boiling point of about 290 to above 350° C., preferably above about 295° C., and exhibits relatively low vapor pressure and low evaporative loss at temperatures of 150° C. and higher. The electrolytic solution has low toxicity and exhibits a pH of about 8–9 for dibasic potassium phosphate solutions and below about 7.0, preferably between about 5 and 6, for other solutions. In addition, the solution exhibits low resistivity and is stable on standing at elevated temperatures of 150°–180° C.

The electrolytic solutions can be prepared, for example, by mixing the phosphate and glycerine together at room temperature such as by stirring. The dibasic potassium phosphate is added in amounts of about 0.1 to 15 wt %, preferably about 2 to 10 wt %, based on the total weight of solution. Alternatively, the electrolytic solution is produced by dissolving an organic acidic salt, an inorganic acidic salt, or mixtures thereof in glycerine or by producing acidic salts in situ via addition of acidic and basic ionogen components to the glycerine. By mixtures thereof, it is meant a mixture of acidic salts, a mixture of basic salts, or a mixture of acidic and basic salts. The solution is then heated to between about 150 and 180° C. for 1 to 12 hours.

Suitable organic and/or inorganic acidic salts include sodium P-toluene sulfonate, potassium hydrogen sulfate and monobasic potassium tartrate.

Alternatively, suitable acidic salts are formed in situ via addition of acidic and basic ionogen components. The salt nature of the ionogen prevents consumption of the acidic component of the electrolyte in the production of esters with the elimination of water as occurs with straight acid solutions above 150° C. Preferably an organic salt is combined with a non-volatile organic or inorganic acid. Suitable salts include potassium acetate, sodium bicarbonate and potassium formate. Suitable inorganic acids include sulfuric acid. Suitable organic acids include P-toluene sulfonic acid and tartaric acid. Preferably potassium acetate is mixed with sulfuric or tartaric acid.

The anodizing method of the present invention may be used to produce anodic films on most types of metals including "valve" metals such as aluminum, tantalum, niobium, titanium, zirconium, silicon. Tantalum is the most common valve metal used.

There are unlimited applications for the process of the present invention including the production of electrolytic capacitors, rectifiers, lightning arresters, and devices in which the anodic film takes the place of traditional electrical insulation, such as special transformers, motors, relays, etc.

In addition, because of the uniformity obtained with the present invention, the electrolytic solution of the present invention may be used in the production of surgical implants where a minimum of induced currents is desirable. The rapid rate of growth achieved with the present invention also allows for the production of practical anti-seize coatings for connectors and plumbing fabricated from valve metals and alloys.

The films provided in the phosphate-containing electrolytes have high thermal stability which is associated with phosphate-doping of valve metal oxides (phosphorus, present as incorporated phosphate, reduces oxygen diffusion at high temperatures by orders of magnitude). Thus, the present invention may be used to produce thermal oxidation-resistant coatings for titanium and other valve metals useful for aircraft or aerospace applications.

EXAMPLES

The invention will be further described by reference to the following examples. These examples should not be construed in any way as limiting the invention.

Example 1

In order to demonstrate the efficacy of the present invention, a sheet of tantalum approximately 0.007 inch thick and 11 cm wide was immersed to a depth of approximately 4 cm in a 600 milliliter stainless steel anodizing vessel containing a magnetic stirring bar. The electrolyte solution consisted of 10 wt % dibasic potassium phosphate dissolved in glycerine at 160° C. The electrolyte was treated by heating to 180° C. for over an hour prior to use in order to reduce the water content to below 0.1 wt %.

The tantalum was connected to a power supply and was made positive relative to the tank of electrolyte. The voltage remained very low (2–3 volts) and no oxide growth was observed until the current density was increased to about 1 milliampere/cm$^2$. The voltage then rose rapidly to approximately 10 volts, and at which time the current was reduced to approximately 0.25 milliampere/cm$^2$. The voltage was observed to vary between about 10 and 15 volts over the course of the next 20 hours.

At the 20 hour mark, 60 ml of glycerine containing approximately 0.5 wt % water was added to the tank and the voltage was observed to rise smoothly to a value of approximately 100 volts in response to the increased amount of water in the electrolyte. The experiment was then terminated and the oxide was found to be uniform in appearance with no visible trace of crystalline oxide.

Example 2

A tantalum coupon having approximately the same dimensions as in Example 1 was anodized, at room temperature, to 5 volts in 1 wt % phosphoric acid. This coupon was then immersed to a depth of approximately 4 cm in the same tank of electrolyte as in Example 1, and was connected to a power supply. The tantalum coupon was then biased positive relative to the tank of electrolyte and the current density was brought up to 0.25 milliampere/cm$^2$. The voltage rose to 10 volts within a few minutes and remained between 10 and about 15 volts for the next 16 hours. Upon examination, the coupon was found to be uniform in appearance and to have no visible indication of crystalline (electrically leaky) oxide present.

Thus, in spite of the extremely thick oxide present, the coupons were of uniform appearance and the oxide was produced at a uniform, and thus predictable rate. The use of a low-voltage traditional anodizing step, in Example 2, eliminated the need for higher current in the initial phase of the non-thickness-limited anodizing with near-optimal current density.

Example 3

In order to demonstrate the advantages of ultrasonic agitation during non-thickness-limited anodizing, a tantalum coupon approximately 0.007 inch thick x 2.5 cm wide was immersed approximately 4 cm in a 600 ml stainless steel tank containing 10 wt % dibasic potassium phosphate dissolved in glycerine and containing less than 0.1 wt % water. A Branson ultrasonic generator, a "Sonifier 185", was used to drive a transducer and horn, the tip of which was immersed in the electrolyte The coupon was biased positive to approximately 30 volts relative to the anodizing container and approximately 50–75 watts was applied ultrasonically. The agitation of the tank contents was thorough; the electrolyte did not have a temperature differential, from top to bottom, as would be expected in the absence of stirring. The coupon showed a uniform color after 12 minutes at 30 volts, again an indication of uniform temperature. The current was observed to vary from about 10 to about 2 milliamperes during the anodization (not a constant current run).

Ultrasonic agitation, then, can be used to supplement/replace conventional stirring during non-thickness-limited anodizing.

Example 4

In order to illustrate the oxide thickness predictability of the non-thickness-limited constant current anodizing process, two tantalum coupons were anodized at different temperatures, current densities, and for different times, but were processed so as to have the same anodic film thickness by passing the same number of coulombs of current through each coupon under constant current non-thickness-limited anodizing conditions. Prior to the non-thickness-limited anodizing step, each coupon was anodized to 5 volts in 1 vol. % phosphoric acid (5 minute hold at voltage) at room temperature, as described in Example 2.

The first tantalum coupon was then anodized in 90 wt % glycerine/10 wt % dibasic potassium phosphate electrolyte containing less than 0.1 wt % water. This coupon was anodized at 0.25 milliampere/cm$^2$ for 20 minutes at 152–154° C. The second tantalum coupon was then anodized in the same electrolyte as the first at 1.0 milliampere/cm$^2$ for 5 minutesat 178–180° C. The product of time and current density was held constant for both coupons.

Both coupons were found to be anodized to the same interference color (indicative of equivalent anodic oxide thickness), equivalent to approximately a 55 volt anodizing color at 85° C. or approximately 1100 angstroms thickness. The major difference between the coupons is that the oxide formed at the higher current density contains some visible crystalline oxide due to the excessive current density. Thus, under constant current conditions, non-thickness-limited anodizing results in a very predictable oxide thickness with time and as a function of current density.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method of anodizing a metal comprising immersing a metal substrate into a glycerine-based electrolytic solution comprising glycerine and about 0.1 to 12 wt % of dibasic potassium phosphate and applying a constant current to produce a uniform oxide film.

2. The method according to claim 1 wherein the solution comprises about 2 to 10 wt % of the dibasic potassium phosphate.

3. The method according to claim 1 wherein the water content of the solution is less than 0.1 wt %.

4. The method according to claim 3 wherein the water content is less than 0.09 wt %.

5. The method according to claim 1 wherein the solution is prepared by mixing the glycerine and the dibasic potassium phosphate and then heating to about 150 to 180° C. for about 1 to 12 hours.

6. The method according to claim 1 wherein the metal is a valve metal.

7. The method according to claim 6 wherein the metal is tantalum.

8. The method according to claim 1 wherein the current is 0.01 to about 0.5 milliampere/cm$^2$.

9. The method according to claim 8 wherein the current is 0.3 to 0.5 milliampere/cm$^2$.

10. The method according to claim 1 wherein the electrolytic solution is agitated while applying the constant current.

11. The method according to claim 10 wherein the electrolytic solution is ultrasonically agitated.

12. The method of claim 1 wherein the anodizing is conducted at a temperature above about 150° C. and below the electrolyte boiling point.

13. A method of anodizing a metal comprising immersing a metal substrate into a glycerine-based electrolytic solution and applying a constant current to produce a uniform oxide film wherein the solution comprises glycerine and at least one acidic organic salt, inorganic salt, or mixtures thereof, and wherein the solution has a pH less than 7.

14. The method according to claim 13 wherein the acidic salt is a P-toluene sulfonate.

15. The method according to claim 13 wherein the solution is produced via addition of acidic and basic ionogen components to glycerine and heating the solution to above 150° C.

16. The method according to claim 13 wherein the solution comprises potassium acetate and sulfuric or tartaric acid.

17. The method according to claim 13 wherein the pH of the solution is between about 5 and 6.

18. The method according to claim 13 wherein the water content of the solution is less than 0.1 wt %.

19. The method according to claim 18 wherein the water content is less than 0.09 wt %.

20. The method according to claim 13 wherein the metal is a valve metal.

21. The method according to claim 20 wherein the metal is tantalum.

22. The method according to claim 13 wherein the current is 0.01 to about 0.5 milliampere/cm$^2$.

23. The method according to claim 22 wherein the current is 0.3 to 0.5 milliampere/cm$^2$.

24. The method according to claim 13 wherein the electrolytic solution is agitated while applying the constant current.

25. The method according to claim 24 wherein the electrolytic solution is ultrasonically agitated.

26. The method of claim 13 wherein the anodizing is conducted at a temperature above about 150° C. and below the electrolyte boiling point.

27. A method of anodizing a metal comprising immersing a metal substrate into a glycerine-based electrolytic solution and applying a constant current to produce a uniform oxide film wherein the electrolytic solution is ultrasonically agitated while applying the constant current.

* * * * *